(12) United States Patent
Berman

(10) Patent No.: US 7,012,755 B1
(45) Date of Patent: Mar. 14, 2006

(54) USE OF A LENS ARRAY TO INCREASE THE CONTRAST RATIO PRODUCED BY A LCOS MICRODISPLAY

(75) Inventor: Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 0 days.

(21) Appl. No.: 10/781,205

(22) Filed: Feb. 17, 2004

Related U.S. Application Data

(60) Provisional application No. 60/447,681, filed on Feb. 14, 2003.

(51) Int. Cl.
*G02B 27/10* (2006.01)
(52) U.S. Cl. ..................................... 359/628
(58) Field of Classification Search ................ 359/628, 359/619, 621, 625, 640, 678, 245, 248, 438, 359/496; 345/87; 353/32, 33
See application file for complete search history.

(56) References Cited

U.S. PATENT DOCUMENTS

| 5,548,349 | A | * | 8/1996 | Mizuguchi et al. | 348/766 |
| 6,195,143 | B1 | * | 2/2001 | Ogawa | 349/95 |
| 6,515,801 | B1 | * | 2/2003 | Shimizu | 359/634 |
| 6,669,345 | B1 | * | 12/2003 | Yajima | 353/38 |
| 2003/0222980 | A1 | * | 12/2003 | Miyagaki et al. | 348/115 |

* cited by examiner

*Primary Examiner*—Hung Xuan Dang
*Assistant Examiner*—Tuyen Tra
(74) *Attorney, Agent, or Firm*—John Carpenter; ReedSmith, LLP

(57) ABSTRACT

A lens array is placed over a cover glass of a pixel based LCoS display device. The lens array is situated so that an individual lens in the array corresponds to an individual pixel in the display device. Each lens collects light and/or reflections from a high contrast portion of its corresponding pixel and forwards it to a viewing area. The lens array reduces effects of low contrast portions of the pixels (particularly, for example, perimeters of adjacent pixels having relatively large differences in electrical field strengths).

42 Claims, 5 Drawing Sheets

Top View

Dark pixel
Bright Pixel

Side View Without Consideration of Lateral Electric Fields

Side View With Consideration of Lateral Electric Fields

USE OF A LENS ARRAY TO INCREASE THE CONTRAST RATIO PRODUCED BY A LCOS MICRODISPLAY

CLAIM OF PRIORITY

This invention claims priority to U.S. provisional patent application Ser. No. 60/447,681 filed Feb. 14, 2003, which is incorporated herein by reference in its entirety.

BACKGROUND OF THE INVENTION

1. Field of Invention

The invention disclosed in this document is a means to increase the contrast ratio of a LCoS microdisplay based video projector. It is accomplished by utilizing a micro lens array to focus light into the central, higher contrast portion of each pixel.

2. Discussion of the Background

SUMMARY OF THE INVENTION

The present inventor has realized the need to increase contrast in display devices. In one embodiment, the present invention eliminates or reduces use of the lower contrast portions of array type display devices such as LCDs.

Roughly described, the invention comprises an array of lenses wherein each lens is positioned to be in line with a corresponding pixel or set of pixels. Preferably, each lens has a one-to-one correspondence with one of the pixels. The pixels are, for example, pixels of an LCoS microdisplay. The lenses are constructed to focus light onto and from a selected portion of each pixel. The selected portion is, for example, a predefined area of a pixel (e.g., a central area of the pixel, or, an area of the pixel having a highest/best resolution representing the intended darkness or color of the pixel).

DESCRIPTION OF THE PREFERRED EMBODIMENTS

Figure 1A:
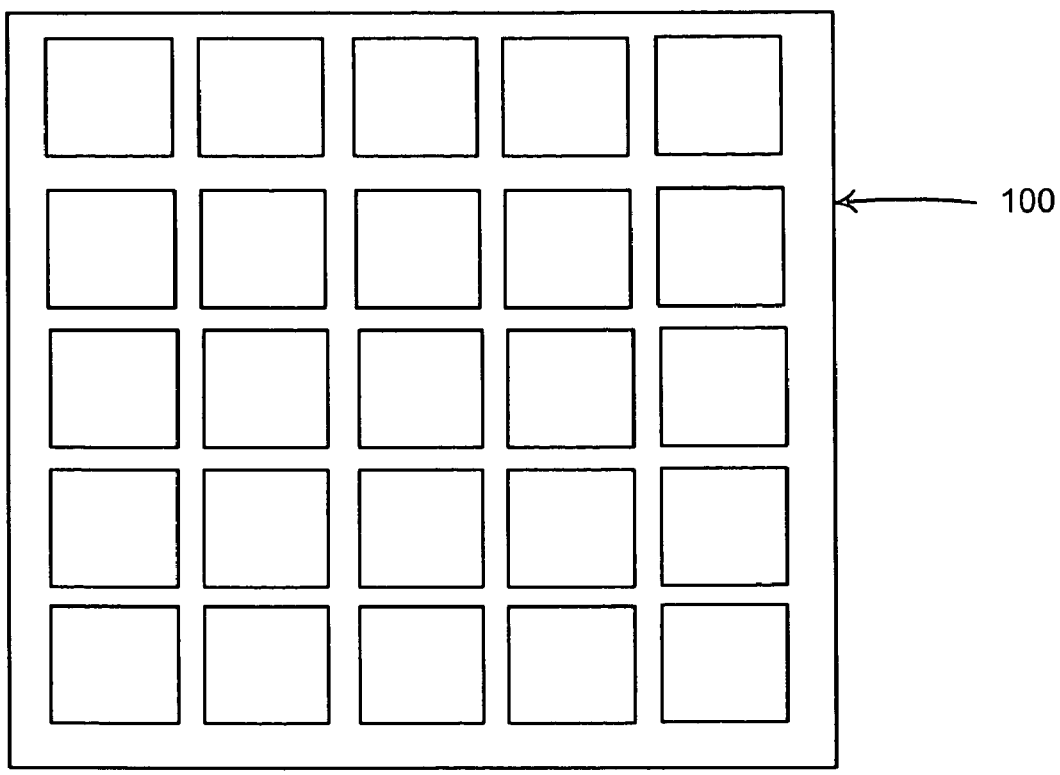
FIG. 1A is a top view of a conventional LCoS microdisplay.
Figure 1B:
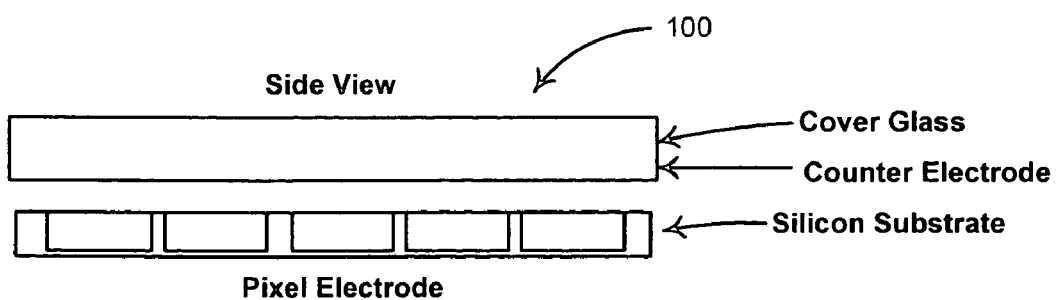
FIG. 1B is a side view of the convention LCoS microdisplay of FIG. 1.

As illustrated in FIG. 1A, the pixels in a LCoS microdisplay 100 are defined by an array of reflective electrodes on the silicon substrate. The pixels are rectangular and arranged in a rectilinear grid. The counter electrode is a single electrode on the cover glass (e.g., see FIG. 1B).

Figure 1C:
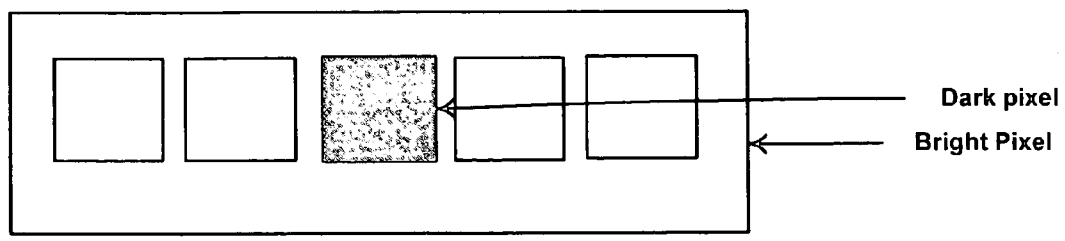
FIG. 1C is a top view of an LCoS microdisplay row.
Figure 1D:
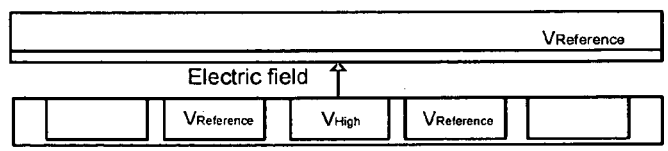
FIG. 1D is a side view of an LCoS microdisplay row without lateral field effects.

The electric field applied to the layer of liquid crystal associated with each pixel can be independently controlled. This is illustrated in FIG. 1C and FIG. 1D. In these figures it is assumed that one pixel is in the dark state and all surrounding pixels are in a bright state. The electric field is established by applying a voltage to the individual pixel on the silicon and a reference voltage to the single electrode on the cover glass. Regardless of whether the drive scheme of the silicon substrate is analog or digital, the layer of liquid crystal responds to the RMS of the applied voltage.

The ideal case is illustrated in the central portion of FIG. 1D. When a pixel's voltage is equal to the reference voltage, the electric field across the associated layer of liquid crystal layer is uniformly 0 and the pixel will be in a uniform bright state. When a pixel's voltage is at V high, the voltage across the associated liquid crystal layer is maximized and the pixel will be in a uniform dark state. When the pixel voltage is between the reference voltage and V high, that pixel will be in a reflective state between full bright and full dark.

Figure 1E:
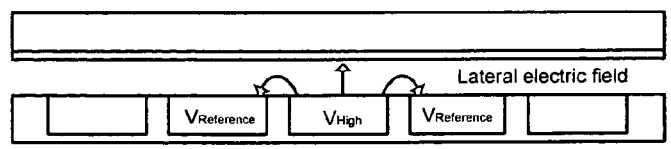
FIG. 1E is a side view of an LCoS microdisplay row with lateral field effects.

A more realistic case is illustrated in the lower portion of FIG. 1E. As before, we see that an electric field is established between the dark pixels to which a V high has been applied and the counter electrode which is at the reference voltage. Also as before, the electric field is absent between the bright pixel to which the reference voltage is applied and the counter electrode. Note, however, that a lateral electric field exists between the dark pixel and the bright pixels adjacent to it. A lateral field does not exist between adjacent pixels when both are in the bright state. Stated more generally, a lateral field will exist whenever adjacent pixels have voltage values that differ. The greater the voltage difference, the larger the lateral field. The effect of the lateral field is discussed with reference to FIG. 2.

Figure 2:
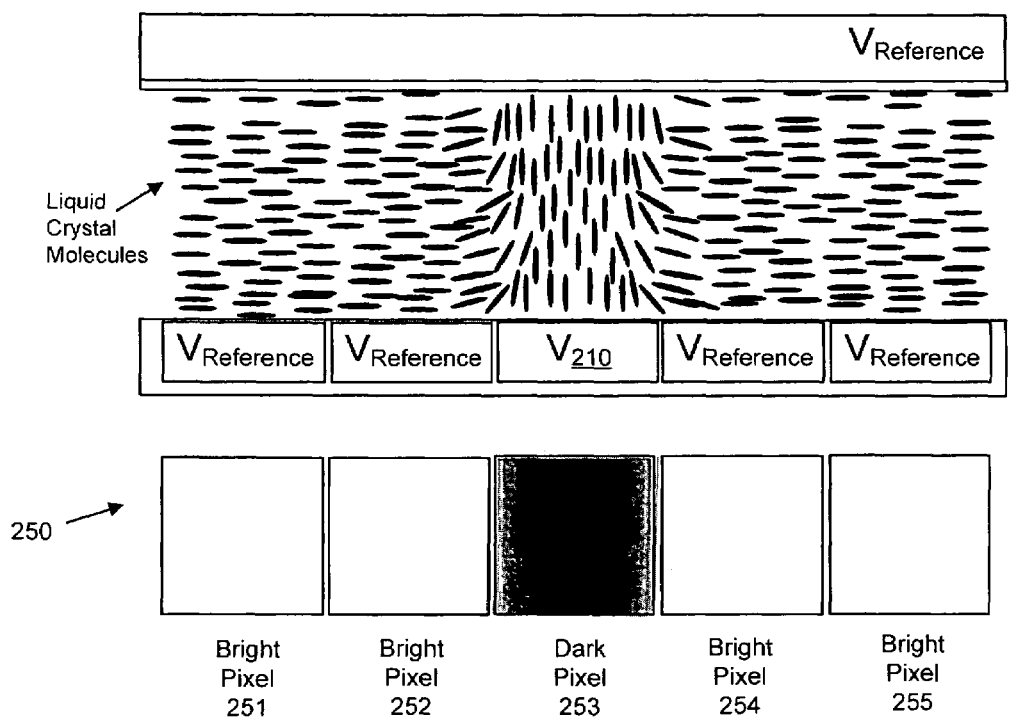
FIG. 2 is a close up of the side view of FIG. 1B.

FIG. 2 is a closer look at the side views of pixels from the bottom portion of FIG. 1E with the addition of graphics to indicate the orientation of molecules in the liquid crystal layer. The orientation chosen for this illustration is representative of one of the many possible electro-optic configurations used in LCoS microdisplays (details of other possible examples would be different but the point about to be made on the effect of a lateral field will still apply). A Brightness scale 250 indicates relative brightness for each part of the illustrated pixels. For example, a bright pixel 252 is graphically illustrated as having a bright portion at the center and left of the pixel, and a dark portion on the right (near the dark pixel 253). The illustrated dark and bright areas also correspond to the corresponding molecular orientation shown directly above.

The lateral field penetrates from a perimeter in the liquid crystal layer (e.g., above a 1st pixel electrode 200) towards the centers of adjacent pixels (e.g., above pixel electrodes 205 and 215) which have voltage values different in their corresponding pixel electrodes. The larger the lateral field, the deeper the penetration. The lateral field adds vectorally to whatever electric field exists between the pixel and the counter electrode. The orientation of liquid crystal molecules in the region effected by of the lateral field will be different from that in the balance of the pixel. This disruption in orientation affects the electro optic effect in such a way as to render non-uniform the shade of gray intended for the pixel. More specifically, in the case of a pixel intended to be fully dark, the perimeter of the pixel is rendered less dark. The adjacent pixels, intended to be fully bright are darkened around a portion, or portions of their perimeters. From the macroscopic standpoint, this produces dark pixels that are less black and bright pixels that are less bright thus reducing the overall display contrast ratio.

The invention disclosed in the document is a means to deal with lateral field effects. By doing so, the contrast ratio of each pixel and, hence, the overall display is maximized.

The invention is explained with reference to FIG. 3. As shown, a lens array 310 has been added to a microdisplay 300. One lens is associated and aligned with each pixel (e.g., lens 320 is associated with the pixel produced by pixel electrode 325). The function of the lens is to converge the light used to illuminate the microdisplay into the central portion of its associated pixel. In this way, the high contrast portion of each pixel is used to modulate the light or illumination 350 that eliminates from the microdisplay (e.g., reduces or eliminates the use of the perimeter portion of the pixel, which, if adjacent to a pixel of a different voltage, would likely have a darkening or lightening effect).

Figure 3:
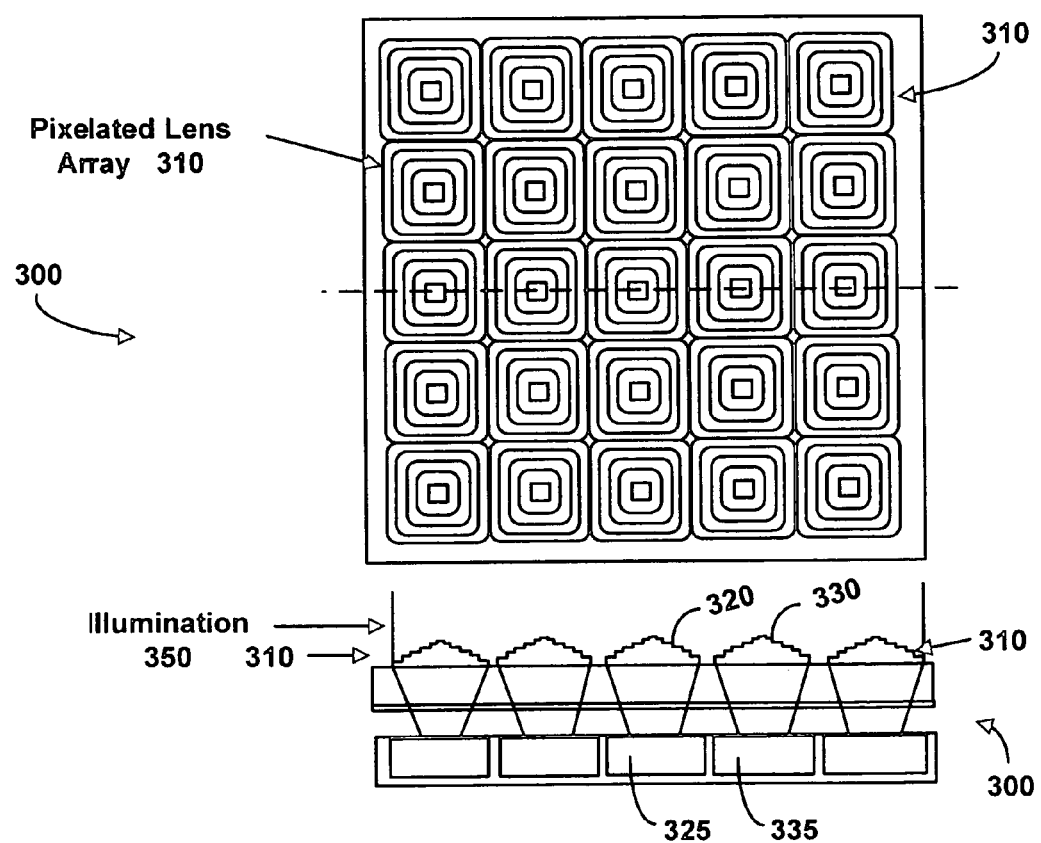
FIG. 3 is a drawing of a pixelated lens array and a pixelated lens array mounted on a light modulator each according to several embodiments of the present invention.

The lens array illustrated in FIG. 3 is depicted as if were made of plastic and the lenses focusing light through the use of diffractive/digital optics. Other mechanisms by which the lens array could be formed would include the use of glass or other substrate materials and the lenses formed from conventional refractive lenses.

The pixilated lens array may be constructed, for example on a sheet and glued to the microdisplay (e.g., using optical adhesive). As shown in FIG. 3, each lens comprises several stair-stepped layers of transparent optical material (e.g., glass, plastic, etc.).

Figure 4:
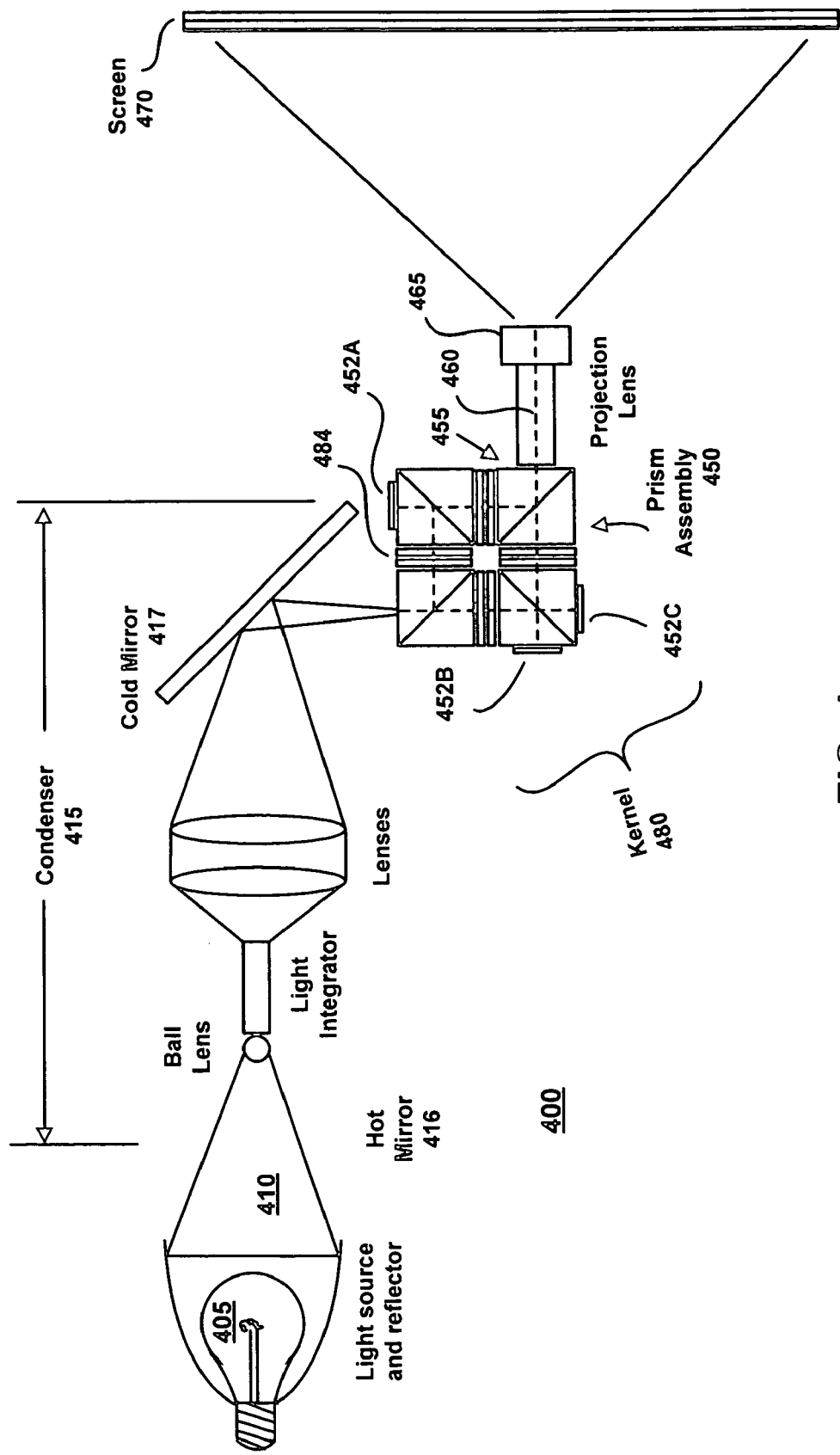
FIG. 4 is an example of a projection device with pixelated lens array microdisplay packages according to an embodiment of the present invention.

FIG. 4 is a diagram of a video projection system 400 having at least one pixelated lens array microdisplay package according to at least one of the embodiments of the present invention. As shown in FIG. 4, white light 410 is generated by a light source 405. The light is collected, homogenized and formed into a proper shape by a condenser 415. UV and IR components are eliminated by filters (e.g., hot/cold mirrors 416/417). The white light 410 then enters a prism assembly 450 (e.g., comprising a set of beamsplitters) at an input face 472. The white light 410 is separated into red, green and blue light beams by the prism assembly. The individual beams are separated based on polarization, color separation, or other techniques (e.g., cholesterics), according to the properties of beam splitting layer(s) in the beam splitters. Polarization and/or other management of the red, green, and blue light beams is performed, at least in part by the beamsplitters and other optical elements (e.g., optical elements 482/484 which may take the form of waveplates, linear polarizers, etc.).

A set of pixelated lens array microdisplay packages 452A, 452B, and 452C (each comprising, for example, a Liquid Crystal on Silicon (LCoS) microdisplay and a pixelated lens array) are provided and positioned on processing faces of the prism assembly such that each package corresponds to one of the light beams (e.g., red, green, and blue) (the prism assembly 450 with the attached microdisplays is called a kernel 480). The light beams follow different paths (light channels) within the prism assembly 450 such that each beam is directed to a pixelated lens array microdisplay package that modulates and reflects the light beam. The microdisplay that modulates and reflects the green beam "displays" the green content of a full color video image. The reflected green beam then contains the green content of the full color video image. Similarly, blue and red content of the full color video image is imparted into the blue and red light beams by the "blue" and "red" microdisplays. On a pixel by pixel basis, the microdisplays modulate and reflect ("display") the colored light beams.

The lens array portion of the pixelated lens array microdisplay package directs the light to be modulated toward high contrast regions of the microdisplay. The high contrast portions may be, for example, non-perimeter portions of pixels or non-perimeter portions of groups of pixels of the microdisplay. The microdisplay modulates and reflects a light beam that is now modulated.

The prism assembly 450 then recombines the modulated beams into a modulated white light beam 460 that contains the full color video image. The resultant modulated white light beam 460 exits the prism assembly 450 and enters a projection lens 465. Finally, the image-containing beam (white light beam 460 that has been modulated and now contains the full color image) is projected onto a screen 470.

The above described video projection system may be utilized in television sets, HDTV televisions, monitors, computer monitors, display systems, home entertainment systems, presentation projectors, and the like.

Kernels and prism assemblies are commercially available in many varying configurations. The present invention includes any such configurations utilizing a pixelated lens array or other optical component according to the present invention. Example additional configurations include, but are not limited to, the various quad style configurations described in Berman et al., U.S. patent application Ser. No. 10/342,219, filed Jan. 13, 2003, and entitled "Design of Prism Assemblies and Kernel Configurations for Use in Projection Systems," the contents of which are incorporated herein by reference in their entirety. In yet other embodiments, the prism assembly may include any of a fourth color channel, channels of different primary colors (e.g., Yellow, Magenta, Cyan), or be designed with single or multiple light channels and configured to utilize a set of sequential primary colors.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, a lens array may be described as individual lenses placed at appropriate locations, a transparent material cut or ground to a shape acting as a lens array, or any other device having an equivalent function or capability, whether or not listed herein, may be substituted therewith. Furthermore, the inventors recognize that newly developed technologies not now known may also be substituted for the described parts and still not depart from the scope of the present invention. All described items, including, but not limited to lens arrays, light modulators (e.g., microdisplay), substrates, materials, etc should also be consider in light of any and all available equivalents.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A device comprising:
  a light modulator wherein the light modulator comprising high contrast portions and low contrast portions; and
  a lens array configured to focus light on the high contrast portions of the light modulator;
  wherein the high contrast portions comprise non-perimeter portions of individual pixels of the light modulator.

2. The device according to claim 1, wherein the light modulator comprises a reflective microdisplay.

3. The device according to claim 2, wherein the reflective microdisplay comprises a LCoS microdisplay.

4. A kernel comprising:
a prism assembly comprising a set of modulating faces and a set of optical components configured to separate light from the light source into a set of component light beams and individually direct each component light beam to one of the modulating faces;
a reflective microdisplay mounted on one of the modulating faces; and
a lens array configured to focus beams of light individually on individual high contrast portions of the microdisplay;
wherein each high contrast portion of the microdisplay comprises a non-perimeter section of a pixel of the microdisplay.

5. The device according to claim 4, wherein the lens array comprises an array of convex lenses.

6. The device according to claim 4, wherein the lens array comprises a flat plate of glass having a series of peaks, each peak corresponding to one of the high contrast portions of the microdisplay.

7. The device according to claim 4, wherein at least one high contrast portion comprises a group of pixels of the microdisplay.

8. The device according to claim 4, wherein at least one high contrast portion comprises a pixel of the microdisplay.

9. The device according to claim 4, wherein each high contrast portion of the microdisplay comprises a high contrast portion of a pixel of the microdisplay.

10. The device according to claim 4, wherein each lens of the lens array comprises a stack of transparent layers.

11. The device according to claim 10, wherein said layers are stair stepped.

12. The device according to claim 11, wherein said layers are glass.

13. The device according to claim 4, wherein the light modulator comprises a Liquid Crystal on Silicon (LCoS) Microdisplay.

14. The device according to claim 4, wherein the device is part of a projection television.

15. The device according to claim 4, wherein the kernel is part of a Liquid Crystal on Silicon (LCoS) projection television.

16. A method comprising the steps of:
focusing individual light beams on high contrast portions of a light modulator; and
individually modulating each of the light beams via the high contrast portion of the light modulator upon which they are focused;
wherein each high contrast portion of the light modulator comprises a non-perimeter portion of a pixel of the light modulator.

17. The method according to claim 16, wherein the light modulator is a reflective Liquid Crystal on Silicon (LCoS) microdisplay.

18. The method according to claim 16, wherein the high contrast portions of the light modulator comprise groups of pixels of the light modulator.

19. The method according to claim 16, wherein each high contrast portion of the light modulator comprises a high contrast portion of a pixel of the light modulator.

20. The method according to claim 16, wherein the light modulator comprises a Liquid Crystal on Silicon (LCoS) Microdisplay.

21. The method according to claim 16, wherein the method is part of a projection television.

22. The method according to claim 16, wherein the method is part of a Liquid Crystal on Silicon (LCoS) projection television.

23. A LCoS television, comprising:
a light source;
a projection lens;
a display screen;
a prism assembly comprising a set of processing faces and a set of optical components configured to separate light from the light source into a set of component light beams and individually direct each component light beam to one of the processing faces; and
a LCoS microdisplay package mounted to each processing face;
wherein:
each microdisplay package comprises a reflective LCoS microdisplay and a lens array configured to individually focus beams of light on a one-to-one basis onto high contrast portions of the microdisplay comprising non perimeter portions of pixels of the microdisplay;
the prism assembly is further configured to recombine light reflected from the processing faces and output the recombined light to the projection lens; and
the projection lens is configured to project the recombined light onto the display screen.

24. A projector, comprising:
a light source;
a projection lens;
a prism assembly comprising a set of processing faces and a set of optical components configured to separate light from the light source into a set of component light and individually direct each component light beam to one of the processing faces and recombine light reflected from the processing faces and output the recombined light to the projection lens; and
a modulation package mounted on each processing face;
wherein each modulation package comprises a light modulator and a lens array configured to focus beams of light individually on individual non-perimeter portions of pixels of the light modulator.

25. The projector according to claim 24, wherein the projector is installed in a television.

26. The projector according to claim 25, wherein the light modulators comprise reflective LCoS microdisplays.

27. An optical device, comprising:
a microdisplay comprising a set of pixels, each pixel comprising a first non-perimeter region of the pixel and a second region comprising the pixel perimeter where the first region has higher contrast compared to the second region;
a lens array comprising a series of lenses, each lens corresponding on a one-to-one basis to a respective one of the microdisplay pixels;
wherein each lens is configured to focus light only on the first higher contrast region of its corresponding microdisplay pixel.

28. The optical device according to claim 27, wherein the microdisplay comprises a reflective Liquid Crystal on Silicon (LCoS) microdisplay installed in a projection system.

29. The optical device according to claim 27, wherein the microdisplay comprises a Liquid Crystal on Silicon (LCoS) microdisplay.

30. The optical device according to claim 27, wherein the optical device is part of a projection television.

31. The optical device according to claim 27, wherein the optical device is part of a Liquid Crystal on Silicon (LCoS) projection television.

32. A projector, comprising:
a set of microdisplays configured to individually modulate at least three color light beams that comprise an image to be projected from the projector;
a set of lens arrays, each lens array matched to a respective microdisplay of the set of microdisplays; and
each lens array is configured to focus individual light beams on non-perimeter portions of pixels of its respective microdisplay;
wherein the high contrast portions of each microdisplay comprise non-perimeter portions of pixels of the microdisplay.

33. The projector according to claim 32, wherein the microdisplays comprise Liquid Crystal on Silicon (LCoS) microdisplays.

34. A kernel comprising:
a prism assembly comprising a set of modulating faces and a set of optical components configured to separate light from the light source into a set of component light beams and individually direct each component light beam to one of the modulating faces;
a reflective microdisplay mounted on one of the modulating faces; and
a lens array configured to focus beams of light individually on individual high contrast portions of the microdisplay;
wherein:
each high contrast portion of the microdisplay is a non-perimeter section of a pixel of the microdisplay; and
each lens of the lens array comprises a stack of transparent layers.

35. The device according to claim 34, wherein said layers are stair stepped.

36. The device according to claim 35, wherein said layers are glass.

37. The device according to claim 34, wherein the kernel is part of a projection television.

38. A method comprising the steps of:
focusing individual light beams on high contrast portions of a light modulator; and
individually modulating each of the light beams via the high contrast portion of the light modulator upon which they are focused;
wherein each high contrast portion of the light modulator is a non-perimeter portion of a pixel of the light modulator;
wherein said step of focusing comprises focusing individual light beams on the non-perimeter portions of pixels of the light modulator.

39. The optical device according to claim 27, wherein the optical device is installed in a light channel of a multi-channel prism assembly.

40. A device comprising:
a light modulator wherein the light modulator comprising high contrast portions and low contract portions; and
a lens array positioned to focus light on the high contrast portions of the light modulator;
wherein the high contrast portions are non-perimeter portions of individual pixels of the light modulator.

41. The kernel according to claim 40, wherein the light modulator comprises a Liquid Crystal on Silicon (LCoS) Microdisplay.

42. The device according to claim 40, wherein the device is part of a Liquid Crystal on Silicon (LCoS) projection television.

* * * * *